(12) United States Patent
Kimura et al.

(10) Patent No.: US 11,804,347 B2
(45) Date of Patent: Oct. 31, 2023

(54) PROTECTING DEVICE AND BATTERY PACK

(71) Applicant: DEXERIALS CORPORATION, Tochigi (JP)

(72) Inventors: Yuji Kimura, Tochigi (JP); Chisato Komori, Tochigi (JP)

(73) Assignee: DEXERIALS CORPORATION, Tochigi (JP)

( * ) Notice: Subject to any disclaimer, the term of this patent is extended or adjusted under 35 U.S.C. 154(b) by 7 days.

(21) Appl. No.: 17/638,564

(22) PCT Filed: Aug. 18, 2020

(86) PCT No.: PCT/JP2020/031183
§ 371 (c)(1),
(2) Date: Feb. 25, 2022

(87) PCT Pub. No.: WO2021/039510
PCT Pub. Date: Mar. 4, 2021

(65) Prior Publication Data
US 2022/0301794 A1    Sep. 22, 2022

(30) Foreign Application Priority Data

Aug. 29, 2019 (JP) .................................. 2019-157432

(51) Int. Cl.
*H01H 37/76* (2006.01)
*H02J 7/00* (2006.01)
(Continued)

(52) U.S. Cl.
CPC .......... *H01H 37/76* (2013.01); *H01M 50/296* (2021.01); *H01M 50/548* (2021.01); *H02J 7/00309* (2020.01)

(58) Field of Classification Search
CPC .. H01H 37/76; H02J 7/00309; H01M 50/296; H01M 50/548
(Continued)

(56) References Cited

U.S. PATENT DOCUMENTS 5,179,436 A * 1/1993 Asdollahi .............. H01H 85/43
337/203
5,287,079 A * 2/1994 Bernardi ............ H01H 85/0417
337/250
(Continued)

FOREIGN PATENT DOCUMENTS

JP   2015-053260 A   3/2015
JP   2016-071972 A   5/2016
(Continued)

OTHER PUBLICATIONS

TW-201633352-English translation (Year: 2016).*
May 9, 2023, Japanese Office Action issued for related JP Application No. 2019-157432.

*Primary Examiner* — Anatoly Vortman
(74) *Attorney, Agent, or Firm* — Paratus Law Group, PLLC

(57) ABSTRACT

Provided is a protecting device that can prevent damage of the device by releasing the pressure inside the housing by providing openings in the housing and can secure appropriate insulation. The protecting device includes: a meltable conductor 3; first and second external connection terminals 7, 8 connected to both ends of the meltable conductor 3; and a housing 6 having a lower case 4 and an upper case 5, wherein one end of the first external connection terminal 7 and one end of the second external connection terminal 8 are led out from the housing 6, and the housing is provided with a first opening 24 formed facing a front surface of the first
(Continued)

external connection terminal 7 and a second opening 25 formed facing a front surface of the second external connection terminal 8.

14 Claims, 18 Drawing Sheets

(51) Int. Cl.
*H01M 50/296* (2021.01)
*H01M 50/548* (2021.01)

(58) Field of Classification Search
USPC .................. 337/203, 249, 250, 272, 298
See application file for complete search history.

(56) References Cited

U.S. PATENT DOCUMENTS

| | | | |
|---|---|---|---|
| 6,344,633 B1 † | 2/2002 | Furuuchi | |
| 6,542,063 B2 * | 4/2003 | Kawashima | H01H 85/0417 337/186 |
| 6,762,670 B1 * | 7/2004 | Yen | H01H 85/43 337/203 |
| 9,972,991 B2 † | 5/2018 | Wang | |
| 10,325,746 B2 * | 6/2019 | Schlaak | H01H 85/055 |
| 10,707,043 B2 | 7/2020 | Yoneda | |
| 10,727,019 B2 | 7/2020 | Yoneda et al. | |
| 11,145,480 B2 | 10/2021 | Yoneda | |
| 2017/0236667 A1 * | 8/2017 | Furuuchi | H01H 37/761 327/525 |
| 2018/0294124 A1 * | 10/2018 | Chen | H01M 10/425 |
| 2019/0122847 A1 † | 4/2019 | Su | |
| 2022/0069367 A1 * | 3/2022 | Kimura | H01H 37/761 |

FOREIGN PATENT DOCUMENTS

| | | | |
|---|---|---|---|
| JP | 2016-134317 A | | 7/2016 |
| JP | 2017-073373 A | | 4/2017 |
| JP | 2018-166099 A | | 10/2018 |
| TW | 201633352 | * | 9/2016 |
| WO | WO 2016117578 | † | 7/2016 |

\* cited by examiner
† cited by third party

PROTECTING DEVICE AND BATTERY PACK

TECHNICAL FIELD

The present technology relates to a protecting device for interrupting a current path and a battery pack using the protecting device. This application is a National Stage Patent Application of PCT International Patent Application No. PCT/JP2020/031183, filed Aug. 18, 2020, under 35 U.S.C. § 371, which claims priority based on Japanese Patent Application No. 2019-157432, filed Aug. 29, 2019, in Japan, the entire contents of which are incorporated herein by reference.

BACKGROUND ART

Many of the secondary batteries that can be charged and reused are provided to users in the form of battery packs. In particular, in order to protect users and electronic appliances, lithium ion secondary batteries having a high volumetric energy density typically include several protective circuits incorporated in battery packs for over-charging protection and over-discharging protection to interrupt the output of the battery pack under predetermined conditions.

Many of electronic devices using lithium ion secondary batteries use an FET switch incorporated in a battery pack to turn ON/OFF the output, for over-charging protection or over-discharging protection of the battery pack. However, even in the cases of the FET switch being short-circuited and damaged for some reason, a large current caused by a surge such as lighting momentarily flowing, or an abnormally decreased output voltage or an excessively high output voltage occurring in an aged battery cell, the battery pack or the electronic appliance should prevent accidents including fire, among others. For this reason, a protecting device is used having a fuse element which interrupts a current path in accordance with an external signal so as to safely interrupt the output of the battery cell under these possible abnormalities.

As a protecting device of such a protective circuit for a lithium ion secondary battery, there is used a structure in which a heat-generator is provided inside the protecting device and a meltable conductor in a current path is blown by heat generation of the heat-generator.

CITATION LIST

Patent Literature

Patent Document 1: Japanese Unexamined Patent Application Publication No. 2015-53260

SUMMARY OF INVENTION

Technical Problem

Applications of lithium-ion secondary batteries have expanded in recent years, and they are being considered for use in larger current applications, such as electric power tools such as electric drivers, and transportation equipment such as hybrid cars, electric vehicles, and power-assisted bicycles, and some of them have begun to be used. In these applications, particularly at startup, a large current exceeding several tens to hundred Ampere may flow. It is desired to implement a protecting device compatible with such a large current capacity.

In order to implement a protecting device compatible with such a large current, there is proposed a protecting device including a meltable conductor having an increased cross-sectional area and an insulating substrate having a heat-generator formed thereon and connected to a surface of the meltable conductor.

FIGS. 17, 18, and 19 are views illustrating an example of a configuration of a protecting device for a high current application, in which FIG. 17 is an external perspective view, FIG. 18 is a cross-sectional view, and FIG. 19 is a plan view with the upper case omitted. A protecting device 100 shown in FIG. 17 includes a meltable conductor 103 connected between first and second external connection terminals 101, 102 that are connected to an external circuit such as a battery charge/discharge circuit to constitutes a part of the external circuit and interrupts the current path between the first external connection terminal 101 and the second external connection terminal 102 by melting the meltable conductor 103 when an abnormality such as an overvoltage occurs.

The protecting device 100 is provided with an insulating substrate 105, the first and second external connection terminals 101, 102 connected to the external circuit, two heat-generators 106 arranged in parallel on the surface of the insulating substrate 105, an insulating layer 107 covering the heat-generators 106, a front surface electrode 108 laminated on the insulating layer 107 and connected to the heat-generators 106, and the meltable conductor 103 mounted via solder paste over the first external connection terminal 101, the front surface electrode 108, and the second external connection terminal 102.

In the protecting device 100, the first and second external connection terminals 101, 102 are arranged from the inside to the outside of the device housing and are connected, by screwing or the like, to connection electrodes provided on an external circuit board on which the protecting device 100 is mounted, whereby the meltable conductor 103 is incorporated into a part of a current path formed on the external circuit board.

The heat-generator 106 is an electrically conductive member having a relatively high resistance value and generating heat when energized, and is made of, e.g., nichrome, W, Mo, Ru, or a material containing them. The heat-generator 106 is connected to a heat-generator feeding electrode 109 formed on the front surface of the insulating substrate 105. The heat-generator feeding electrode 109 is connected to a third external connection terminal 110 via solder paste. In the protecting device 100, the third external connection terminal 110 is connected to a connection electrode provided on the external circuit board on which the protecting device 100 is mounted, whereby the heat-generator 106 is connected to an external power source provided in the external circuit. The energization and heat generation of the heat-generator 106 is continuously controlled by, e.g., a switching element (not shown).

The heat-generator 106 is covered with the insulating layer 107 made of, e.g., a glass layer, and the front surface electrode 108 is formed on the insulating layer 107 so that the front surface electrode 108 is overlapped with the heat-generator 106 through the insulating layer 107. The meltable conductor 103 connected between the first and second external connection terminals 101, 102 is connected to the front surface electrode 108 via solder paste.

Thus, the heat-generator 106 and the meltable conductor 103 are overlapped and thermally connected, and the protecting device 100 can blow the meltable conductor 103 when the heat-generator 106 generates heat by energization.

The meltable conductor 103 may be formed of a low melting point metal such as Pb free solder or a high melting point metal such as Ag, Cu or an alloy containing these as main components, or may have a laminated structure of a low melting point metal and a high melting point metal. The meltable conductor 103 is connected from the first external connection terminal 101 to the second external connection terminal 102 across the front surface electrode 108, thereby constituting a part of the current path of the external circuit in which the protecting device 100 is incorporated. When a rate-exceeding current flows, the meltable conductor 103 is blown by self-heating (Joule heat) or by heat generation of the heat-generator 106, to interrupt the current path between the first and second external connection terminals 101, 102.

When it is necessary to interrupt the current path of the external circuit, a switching element energize the heat-generator 106 of the protecting device 100. As a result, the heat-generator 106 of the protecting device 100 is heated to a high temperature, and the meltable conductor 103 incorporated in the current path of the external circuit is blown. The meltable conductor 103 is blown by drawing melted material of the meltable conductor 103 to the front surface electrode 108 and the first and second external connection terminals 101, 102 having high wettability. Therefore, the protecting device 100 can interrupt the path from the first external connection terminal 101 via the front surface electrode 108 to the second external connection terminal 102, thereby interrupting the current path of the external circuit.

The protecting device 100 includes a lower case 111 and an upper case 112, and the lower case 111 and the upper case 112 are joined to constitute a housing 113 of the protecting device 100. The lower case 111 supports the insulating substrate 105, the first and second external connection terminals 101, 102, and the third external connection terminal 110. The upper case 112 forms a space for accommodating the above-described internal elements of the device. The lower case 111 is bonded by applying an adhesive to the outer edge thereof and brought in contact and joined with the upper case 112.

Here, in order for the protecting device 100 to be compatible with a large current application, it is necessary to increase the size of the meltable conductor 103 and increase the heat generation amount of the heat-generator 106 as described above. However, this might increase the thermal shock at the time of melting of the meltable conductor 103 and might rapidly expand the air inside the case, thereby causing a possibility that the upper case 112 comes off, as shown in FIG. 20. With regard to such a problem, there have been proposed methods of increasing the bonding strength of the housing 113 to withstand the pressure, or providing an opening in the housing 113 to release the pressure.

However, in order to increase the strength of the housing, it is necessary to form a cylindrical or box-shaped structure with ceramic or the like, which would undesirably increase the production cost. In the case of providing an opening, if the opening is not in an appropriate position, vaporized material of the blown fuse element gushes out of the opening to contaminate the inside of the electronic device or to cause an unexpected short circuit, thus failing to provide an appropriate insulation.

Therefore, it is an object of the present invention to provide a protecting device and a battery pack using the protecting device that can prevent damage of the device by releasing the pressure inside the housing by providing openings in the housing and can secure appropriate insulation.

Solution to Problem

In order to solve the above problem, the protecting device according to the present technology includes: a meltable conductor; first and second external connection terminals connected to both ends of the meltable conductor; and a housing having a lower case and an upper case, wherein one end of the first external connection terminal and one end of the second external connection terminal are led out from the housing, and wherein the housing is provided with a first opening formed facing a front surface of the first external connection terminal, and a second opening formed facing a front surface of the second external connection terminal.

The battery pack according to the present technology includes: one or more battery cells; and a protecting device connected to a charge/discharge path of the battery cell to interrupt the charge/discharge path, wherein the protecting device comprises: a meltable conductor; first and second external connection terminals connected to both ends of the meltable conductor; and a housing having a lower case and an upper case, wherein one end of the first external connection terminal and one end of the second external connection terminal are led out from the housing, and wherein the housing is provided with a first opening formed facing a front surface of the first external connection terminal, and a second opening formed facing a front surface of the second external connection terminal.

Advantageous Effects of Invention

By forming a first opening facing the front surface of the first external connection terminal and the second opening facing the front surface of the second external connection terminal, the present technology can release the air rapidly expanding inside the housing at the time of blowout of the meltable conductor and prevent the housing from being damaged due to a sudden increase in the internal pressure. Further, even when the melted conductor of the meltable conductor or the vaporized material thereof is scattered from the first and second openings to the outside of the housing, the present technology can trap the melted conductor or the vaporized material thereof on the first and second external connection terminals. Thus, the protecting device can prevent damage of the device by releasing the pressure inside the housing and can prevent adhering of the melted conductor or the vaporized material thereof gushing out of the first and second openings to the periphery of the device, thereby preventing the risk of contamination inside the electronic device or an unexpected short circuit.

DESCRIPTION OF EMBODIMENTS

Figure 1:
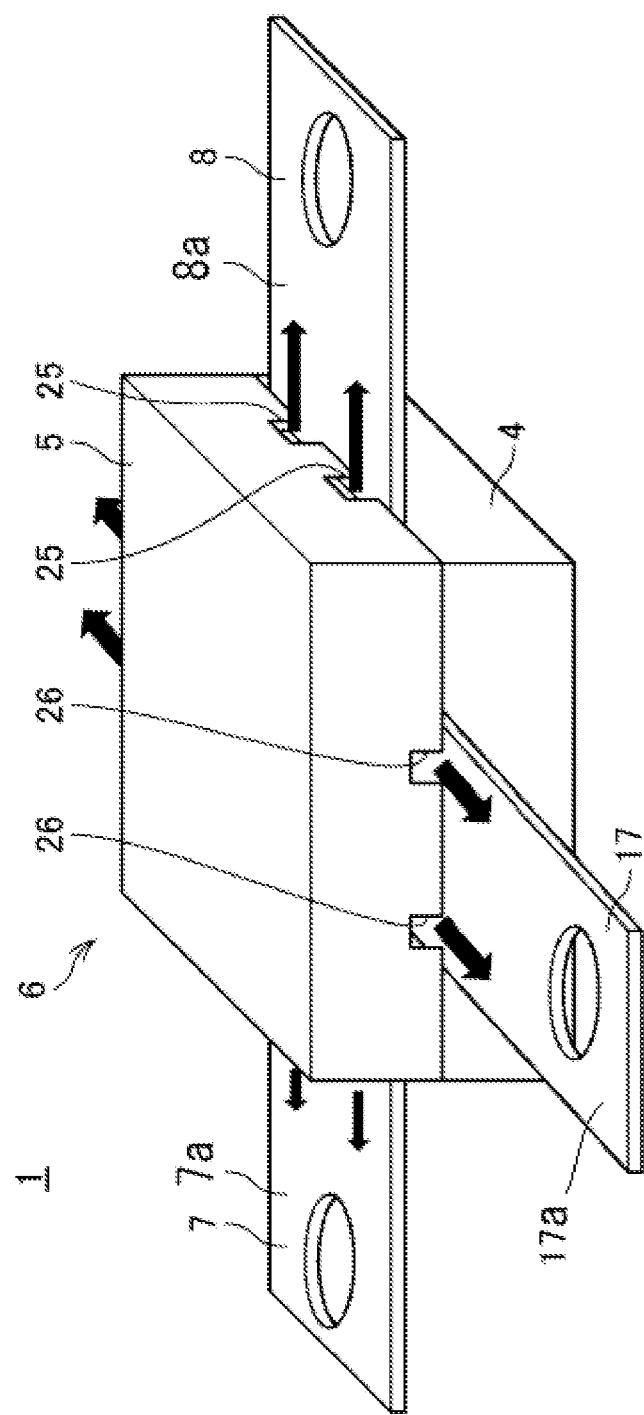
FIG. 1 is an external perspective view of a protecting device according to the present technology.

Embodiments of a protecting device and a battery pack according to the present technology will now be more particularly described with reference to the accompanying drawings. It should be noted that the present technology is not limited to the embodiments described below and various modifications can be added to the embodiment without departing from the scope of the present technology. The features shown in the drawings are illustrated schematically and are not intended to be drawn to scale. Actual dimensions should be determined in consideration of the following description. Moreover, those skilled in the art will appreciate that dimensional relations and proportions may be different among the drawings in some parts.

First Embodiment

Figure 2:
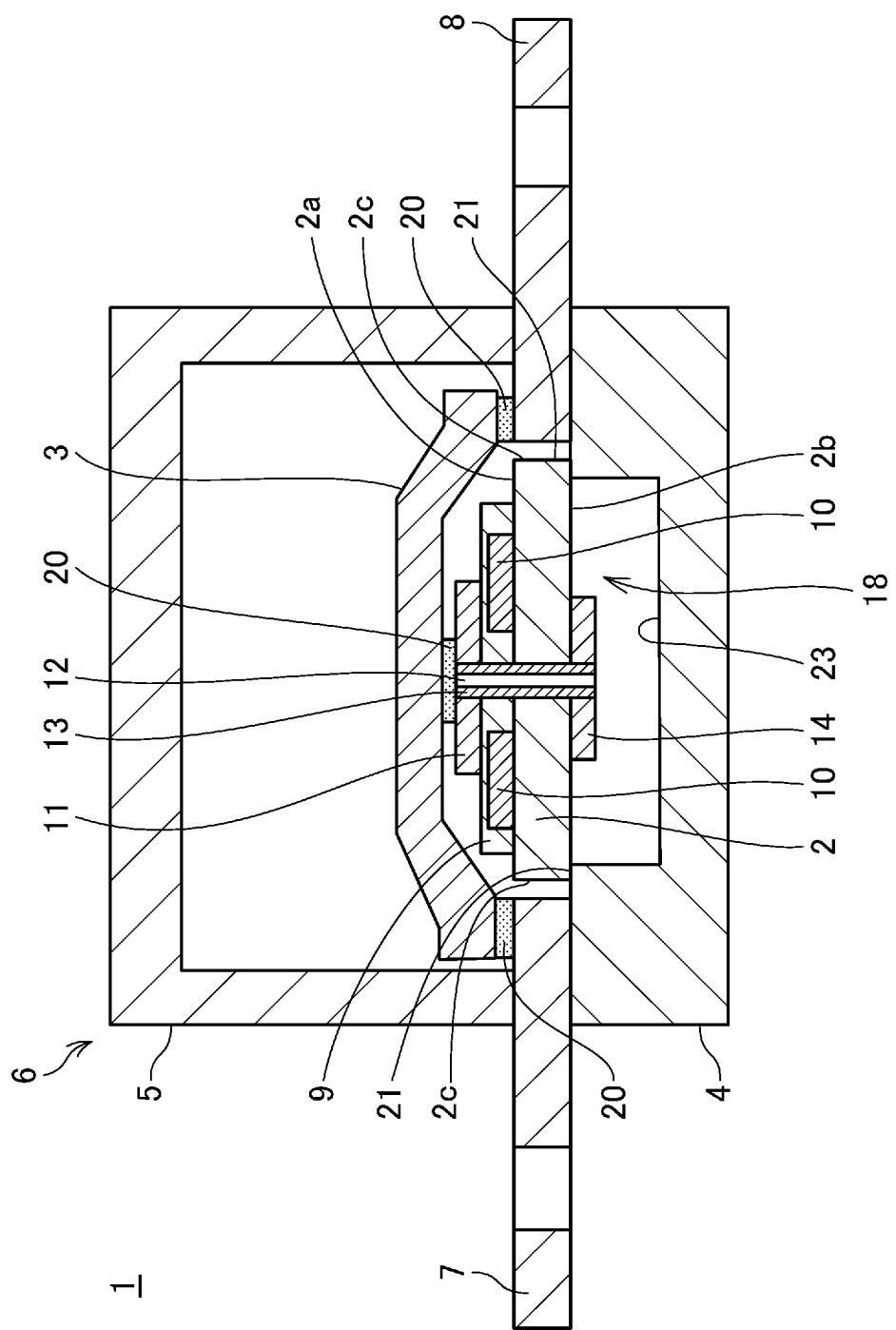
FIG. 2 is a cross-sectional view of a protecting device according to the present technology.
Figure 3:
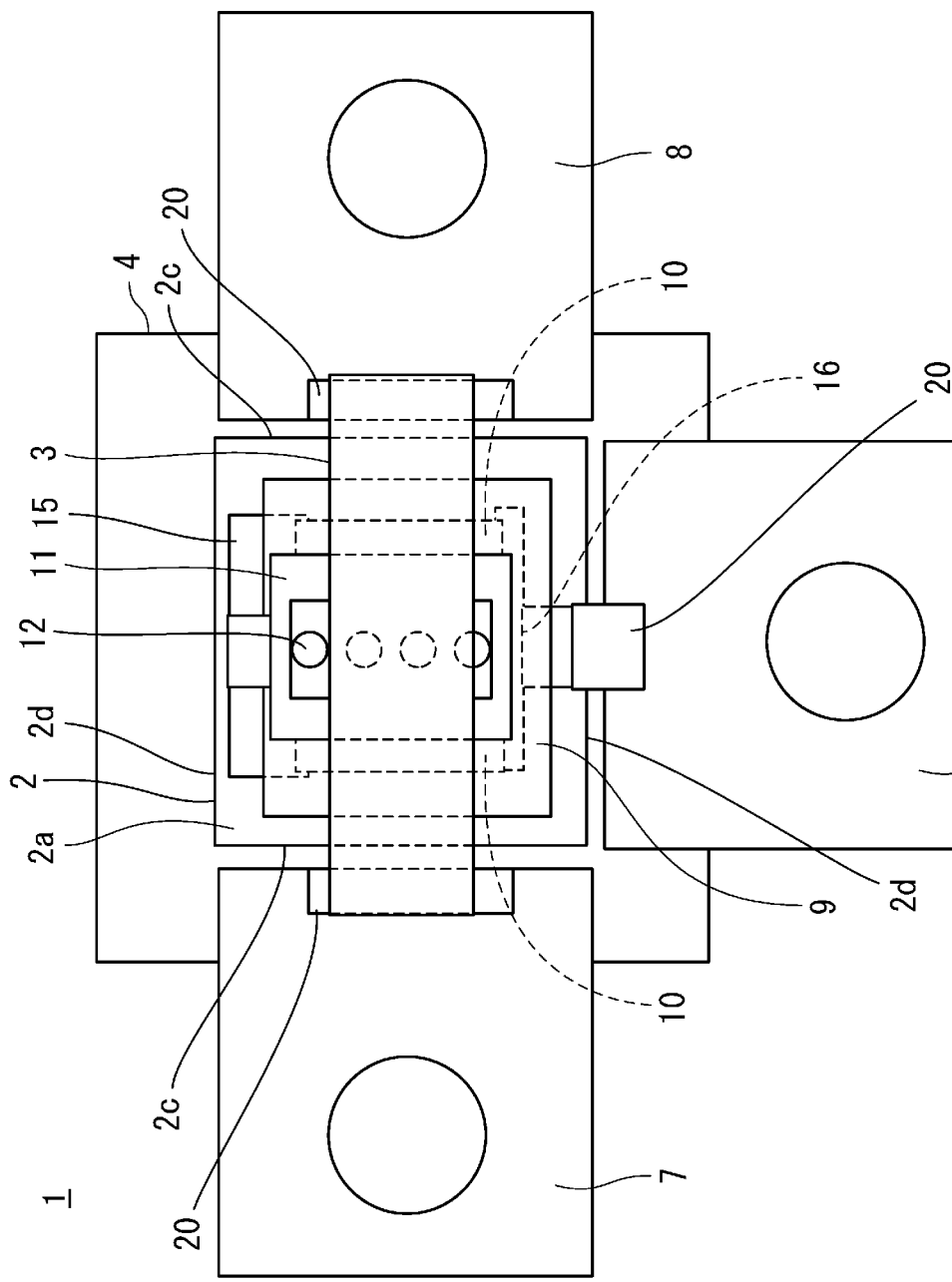
FIG. 3 is a plan view illustrating the protecting device according to the present technology with the upper case omitted.

FIGS. 1, 2, and 3 illustrate a protecting device 1 according to the present technology. The protecting device 1 includes: an insulating substrate 2; a meltable conductor 3 mounted on a front surface of the insulating substrate 2; and a housing 6 including a lower case 4 supporting the rear surface of the insulating substrate 2 and an upper case 5 covering the front surface of the insulating substrate 2, the housing 6 being formed by joining the lower case 4 and the upper case 5 to accommodate the insulating substrate 2. The protecting device 1 further includes first and second external connection terminals 7, 8. The first and second external connection terminals 7, 8 are arranged from the inside to the outside of the housing 6 and are connected, by screwing or the like, to connection electrodes provided on an external circuit board on which the protecting device 1 is mounted. The first and second external connection terminals 7, 8 are supported by the lower case 4, and respective one ends thereof are connected by the meltable conductor 3. The protecting device 1 is incorporated into the external circuit via the first and second external connection terminals 7, 8, whereby the meltable conductor 3 constitutes a part of the current path of the external circuit, and the current path is blown by heat generation of a heat-generator 10 described later or rate-exceeding overcurrent.

Insulating Substrate

The insulating substrate 2 is formed of an insulating member such as alumina, glass ceramics, mullite, or zirconia. Alternatively, the insulating substrate 2 may be made of a material used for a printed wiring board such as a glass epoxy substrate or a phenol substrate. In the insulating substrate 2 shown in FIG. 3, both side edges in the extending direction of the meltable conductor 3 connected via a front surface electrode 11 to be described later are defined as first side edges 2c, and both side edges at which a heat-generator electrode 15 and a heat-generator feeding electrode 16 to be described later are formed are defined as second side edges 2d.

Heat-Generator

The heat-generator 10 for blowing the meltable conductor 3 is a conductive member having a relatively high resistance value to generate heat when energized, and is made of, e.g., nichrome, W, Mo, Ru, Cu, Ag, or an alloy containing these as main components. The heat-generator 10 can be formed by mixing the powder of the alloy, the composition, or the compound with a resin binder or the like to form a paste, forming a pattern of the paste on a front surface 2a of the insulating substrate 2 using a screen printing technique, and baking the paste.

The heat-generator 10 is provided on the front surface 2a of the insulating substrate 2 and covered with an insulating layer 9. On the insulating layer 9, the front surface electrode 11 to be described later is laminated. The insulating layer 9 is provided for protecting and insulating the heat-generator 10 and for efficiently transmitting heat of the heat-generator 10 to the front surface electrode 11 and the meltable conductor 3, and is made of, e.g., a glass layer.

One end of the heat-generator 10 is connected to the heat-generator electrode 15 formed on the front surface 2a of the insulating substrate 2. The heat-generator electrode 15 is connected to the front surface electrode 11 formed on the insulating layer 9. Thus, the heat-generator 10 is electrically connected to the meltable conductor 3 mounted on the front surface electrode 11. The other end of the heat-generator 10 is connected to the heat-generator feeding electrode 16. The heat-generator feeding electrode 16 is formed on the front surface 2a of the insulating substrate 2, is connected to a third external connection terminal 17 via a bonding material 20 such as solder paste, and is connected to the external circuit through the third external connection terminal 17. By connecting the protecting device 1 to the external circuit, the heat-generator 10 is incorporated into a power supply path to the heat-generator 10 formed in the external circuit via the third external connection terminal 17. Also shown in FIG. 1 is front surface 17a.

Further, as shown in FIG. 3, it is preferable that the heat-generator 10 is configured so that the current flow direction thereof intersects the current flow direction of the meltable conductor 3, and that the heat-generator electrode 15 and the heat-generator feeding electrode 16 are formed at the second side edges 2d in order to efficiently utilize the area of the insulating substrate 2.

A plurality of the heat-generators 10 may be formed on the surface of the insulating substrate 2. The example of the protecting device 1 shown in FIG. 3 is provided with two heat-generators 10. One end of each heat-generator 10 is connected to the heat-generator electrode 15, and the other end is connected to the heat-generator feeding electrode 16, so that the heat-generators 10 are electrically connected in parallel.

In the protecting device 1, the heat-generator 10 may be formed inside the insulating layer 9 laminated on the front surface 2a of the insulating substrate 2. In the protecting device 1, the heat-generator 10 may be formed inside the insulating substrate 2. Alternatively, in the protecting device 1, the heat-generator 10 may be formed on a rear surface 2b of the insulating substrate 2. When the heat-generator 10 is formed on the rear surface 2b of the insulating substrate 2, one end of the heat-generator 10 is connected to the rear surface electrode formed on the rear surface 2b of the insulating substrate 2, and is electrically connected to the meltable conductor 3 mounted on the front surface electrode 11 via a conductive through-hole for connecting the rear surface electrode and the front surface electrode 11. The other end of the heat-generator 10 is connected to the third external connection terminal 17 via a heat-generator feeding electrode formed on the rear surface 2b of the insulating substrate 2.

Front Surface Electrode

The front surface electrode 11 connected to the heat-generator 10 via the heat-generator electrode 15 and connected to the meltable conductor 3 is formed on the insulating layer 9. The front surface electrode 11 is connected to the meltable conductor 3 via the bonding material 20 such as solder paste. When the meltable conductor 3 melts, the melted conductor 3a is aggregated on the front surface electrode 11 to blow the meltable conductor 3.

The front surface electrode 11 may be provided with a suction hole 12. When the meltable conductor 3 melts, the suction hole 12 sucks the melted conductor 3a by a capillary phenomenon, thereby reducing the volume of the melted conductor 3a held on the front surface electrode 11 (see FIG. 4). The protecting device 1 can reduce the volume of the melted conductor 3a by sucking the melted conductor 3a into the suction hole 12 even when the amount of the melted conductor 3a is increased by increasing the cross-sectional area of the meltable conductor 3 in order to be compatible with a large current application. The insulating substrate 2 having such a configuration constitutes a blowout member 18 in which the energized heat-generator 10 generates heat to melt the meltable conductor 3, and the melted conductor 3a is sucked into the suction hole 12 to blow the meltable conductor 3.

Thus, the protecting device 1 can reduce the volume of the melted conductor 3a held on the front surface electrode 11 to more reliably insulate the first and second external connection terminals 7, 8, reduce scattering of the melted conductor 3a due to arc discharge generated when the meltable conductor 3 is melted to prevent reduction in insulation resistance, and prevent short circuit failure which might be caused by adhesion of the meltable conductor 3 to the peripheral circuit around the mounting position thereof. Also shown in FIG. 1 are front surfaces 7a and 8a.

The inner surface of the suction hole 12 is provided with a conductive layer 13 formed thereon. By forming the conductive layer 13, the suction hole 12 facilitates suction of the melted conductor 3a. The conductive layer 13 is formed of, e.g., any one of copper, silver, gold, iron, nickel, palladium, lead, tin, or an alloy containing any one of them as a main component and can be formed on the inner surface of the suction hole 12 by known methods such as electroplating or printing of conductive paste. The conductive layer 13 may be formed by inserting a plurality of metal wires or an aggregate of conductive ribbons into the suction hole 12.

The suction hole 12 is preferably formed as a through hole penetrating in the thickness direction of the insulating substrate 2. Thus, the suction hole 12 can suck the melted conductor 3a up to the side of the rear surface 2b of the insulating substrate 2, thereby sucking more amount of the melted conductor 3a to reduce the volume of the melted conductor 3a at the melting portion. The suction hole 12 may be formed as a non-through hole.

The conductive layer 13 of the suction hole 12 is continuous with the front surface electrode 11 formed on the front surface 2a of the insulating substrate 2. The front surface electrode 11 supports the meltable conductor 3 and aggregates the melted conductor 3a thereon, and the front surface electrode 11 and the conductive layer 13 are continuous, so that the melted conductor 3a can be easily guided into the suction hole 12.

By heating the conductive layer 13 and the front surface electrode 11 by the heat-generator 10, the melted conductor 3a of the meltable conductor 3 can be easily sucked into the suction hole 12 and can be easily aggregated on the front surface electrode 11. Therefore, the protecting device 1 can promote the action of sucking the melted conductor 3a from the front surface electrode 11 to the suction hole 12 via the conductive layer 13 to surely blow the meltable conductor 3.

There may be formed a rear surface electrode 14 connected to the conductive layer 13 of the suction hole 12 on the rear surface 2b of the insulating substrate 2. Since the rear surface electrode 14 is continuous with the conductive layer 13, when the meltable conductor 3 is melted, the melted conductor 3a moved through the suction hole 12 is aggregated thereon (see FIG. 4). Thus, the protecting device 1 can suck more amount of the melted conductor 3a and reduce the volume of the melted conductor 3a at the melting portion.

It should be noted that, forming a plurality of suction holes 12 in the protecting device 1 can increase the number of paths for sucking the melted conductor 3a of the meltable conductor 3 to suck more amount of the melted conductor 3a, thereby reducing the volume of the melted conductor 3a at the melting portion. In this case, the plurality of suction holes 12 may be formed across the width direction of the meltable conductor 3 in which the front surface electrode 11 and the meltable conductor 3 overlap. The suction hole 12 may also be formed in a region of the front surface electrode 11 which does not overlap with the meltable conductor 3 and over which the melted conductor 3a will be made wet and spread.

When providing the two heat-generators 10 in parallel, in any case where the heat-generators are formed on the front surface 2a, the rear surface 2b, or the inside of the insulating substrate 2, it is preferable to form the heat-generators on both sides of the suction hole 12 in order to heat the front surface electrode 11 and the rear surface electrode 14 and to suck and aggregate more amount of the melted conductor 3a.

Housing

Next, the housing 6 of the protecting device 1 will be described. The housing 6 is formed by joining the lower case 4 and the upper case 5 with an adhesive. The housing 6 can be formed of an insulating member such as various engineering plastics, thermoplastic plastics, and ceramics, among others. The housing 6 has an internal space on the front surface 2a of the insulating substrate 2 sufficient for the meltable conductor 3 to expand spherically at the time of blowout and for the melted conductor 3a to aggregate on the front surface electrode 11 and the first and second external connection terminals 7, 8.

Lower Case

As shown in FIG. 2, the lower case 4 is provided with, at a substantially central portion, a recessed portion 23 for holding the central portion of the insulating substrate 2 in a bridge-like manner. The lower case 4 supports the outer edge of the insulating substrate 2 along the side edge of the recessed portion 23. Providing the recessed portion 23 reduces the contact area between the lower case 4 and the insulating substrate 2, thereby suppressing the heat of the heat-generator 10 absorbed into the lower case 4. Therefore, the protecting device 1 can efficiently transfer the heat of the heat-generator 10 to the meltable conductor 3 to blow the meltable conductor 3 more rapidly. In particular, providing the recessed portion 23 at the substantially central portion of the lower case 4 makes the portion directly under the heat-generator 10 to be hollow, thereby suppressing heat dissipation from the heat-generator 10 to the lower case 4.

Upper Case

The upper case 5 covers the meltable conductor 3 formed on the front surface 2a of the insulating substrate 2 and the first and second external connection terminals 7, 8, and has an internal space in which the melted conductor 3a can be aggregated on the front surface electrode 11 and the first and second external connection terminals 7, 8.

The upper case 5 is provided with recesses, which are formed on the lower end surfaces of the side wall abutting the lower case 4, for arranging the first and second external connection terminals 7, 8 and the third external connection terminal 17 supported by the lower case 4 from the inside to the outside of the housing 6. The recesses are formed at positions corresponding to the arrangement positions of the first and second external connection terminals 7, 8 and the third external connection terminal 17, and have respective shapes corresponding to the shapes of the first and second external connection terminals 7, 8 and the third external connection terminal 17. Thus, the lower case 4 and the upper case 5 of the housing 6 can be brought in contact and joined without gaps, with the first and second external connection terminals 7, 8 and the third external connection terminal 17 being led out of the housing.

First to Third Openings

The protecting device 1 according to the present technology includes a first opening 24 formed facing the front surface of the first external connection terminal 7 and a second opening 25 formed facing the front surface of the second external connection terminal 8. In addition, the protecting device 1 includes a third opening 26 formed facing the front surface of the third external connection terminal 17.

In the protecting device 1, increased size of the meltable conductor 3 in order to be compatible with a large current application or increased heat generation amount of the heat-generator 10 would increase the load on the housing 6 due to the increase in the internal pressure at the time of blowout of the meltable conductor 3. With regard to this, the protecting device 1 having the first to third openings 24 to 26 can release the air rapidly expanding inside the housing 6 at the time of blowout of the meltable conductor 3, thereby preventing the housing 6 from being damaged due to a sudden increase in the internal pressure.

The first opening 24 is formed facing the front surface of the first external connection terminal 7, the second opening 25 is formed facing the front surface of the second external connection terminal 8, and the third opening 26 is formed facing the front surface of the third external connection terminal 17. Since the first to third openings 24 to 26 are formed at the lower edges of the upper case 5, the lower case 4 and the upper case 5 have excellent moldability when molded of a plastic such as LCP (Liquid Crystal Polymer) and are also excellent in processability in other materials and in the manufacturing process as well.

The first to third external connection terminals 7, 8, and 17, being led out of the housing 6 and connected to the electrode terminals of the external circuit, have a temperature much lower than that of the melted conductor 3a or the vaporized material of the meltable conductor 3 melted by the heat generation of the heat-generator 10 or the self-heat generated by the overcurrent and. In addition, the conductive first to third external connection terminals 7, 8, and 17 are excellent in wettability with regard to the melted conductor 3a. Therefore, the melted conductor 3a and the vaporized material thereof passing through the first to third openings 24 to 26 are easily brought into contact with the first to third external connection terminals 7, 8, and 17 facing the first to third openings 24 to 26 and are cooled rapidly by being brought into contact with them.

Therefore, in the protecting device 1, even when the melted conductor 3a of the meltable conductor 3 and the vaporized material thereof are scattered from the first to third openings 24 to 26 to the outside of the housing 6, they will adhere to and be trapped by the first and second external connection terminals 7, 8 and the third external connection terminal 17 made of metal. Thus, the protecting device 1 can prevent damage of the device by releasing the pressure in the housing and can prevent the melted conductor 3a and the vaporized material thereof gushing out of the first to third openings 24 to 26 from adhering to the periphery of the device, thereby preventing the risk of contamination inside the electronic device or an unexpected short circuit.

The first to third openings 24 to 26 are formed at the lower edges of the side walls of the upper case 5 and, upon joining the lower case 4 and the upper case 5, face the first to third external connection terminals 7, 8, and 17 sandwiched between the lower case 4 and the upper case 5 and arranged from the inside to the outside the housing 6.

Further, since the first to third external connection terminals 7, 8, and 17 are supported by the lower case 4 in the same manner as the insulating substrate 2 on which the meltable conductor 3 is mounted, the first to third openings 24 to 26 formed at the lower edge of the side wall of the upper case 5 are opened on substantially the same plane as the meltable conductor 3, thereby achieving a smooth flow and discharge of the expanded air.

Figure 5:
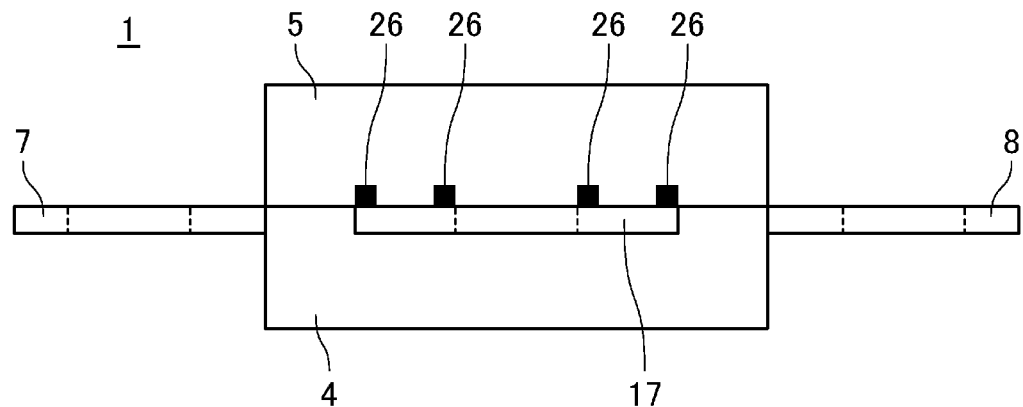
FIG. 5 is a side view of a protecting device according to the present technology.
Figure 6:
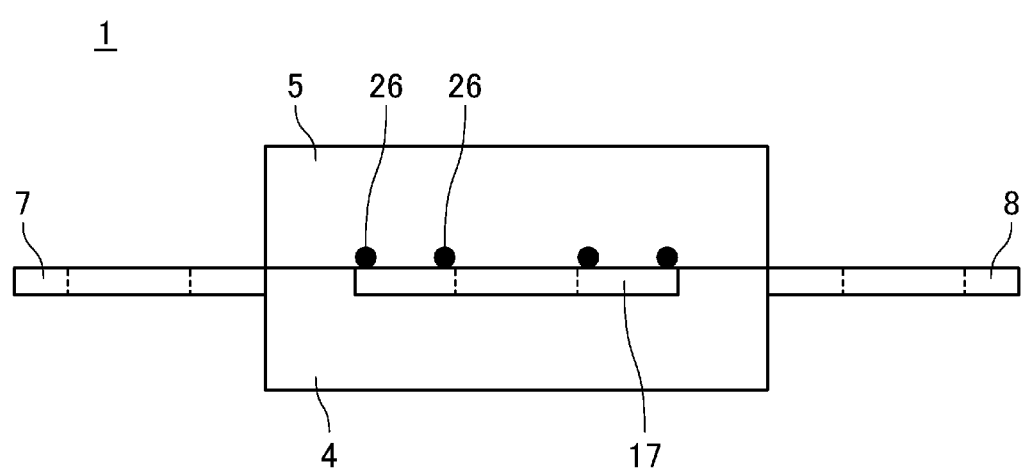
FIG. 6 is a side view of a protecting device according to the present technology.
Figure 7:
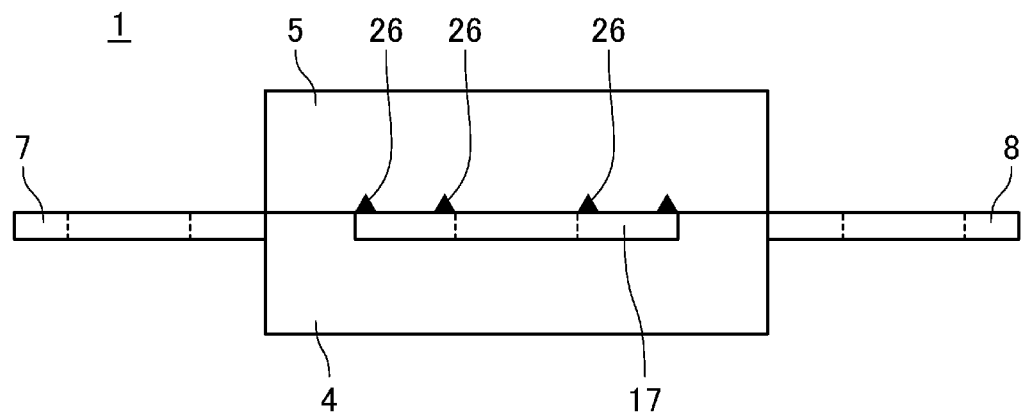
FIG. 7 is a side view of a protecting device according to the present technology.
Figure 8:
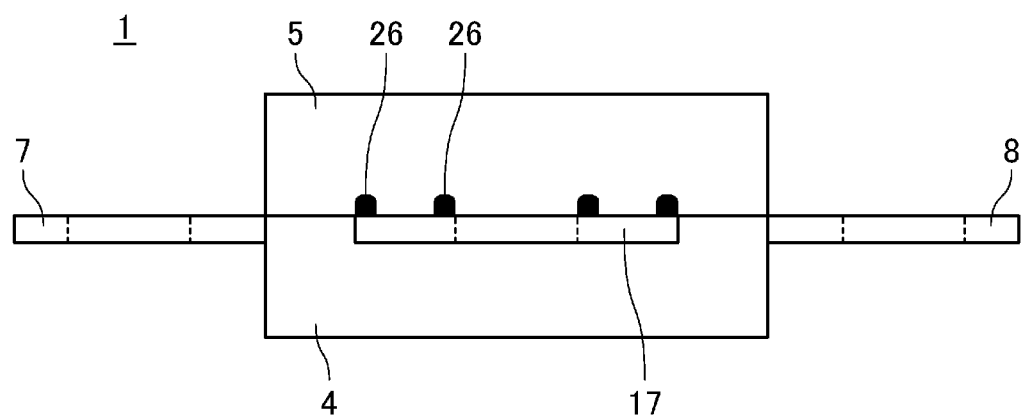
FIG. 8 is a side view of a protecting device according to the present technology.

The shapes of the first to third openings 24 to 26 are not particularly limited and can take various shapes including a rectangular shape (FIG. 5), a circular shape (FIG. 6), a triangular shape (FIG. 7), a dome-like shape (FIG. 8), an elliptical shape, and a trapezoidal shape, among other shapes in a side view. In particular, in, e.g., a triangular shape and a trapezoidal shape, the width of the lower side is preferably wider than the width of the upper side in a side view. By making the width of the lower edge wider, the melted conductor 3a and the vaporized material thereof passing through the first to third openings 24 to 26 can be easily brought into contact with the first to third external connection terminals 7, 8, and 17 facing the lower portions of the first to third openings 24 to 26, thereby facilitating trapping. In addition, the first to third openings 24 to 26 having circular or elliptical shape facilitate trapping of the melted conductor 3a having a spherical shape.

It is preferable to form a plurality of the first to third openings 24 to 26. This configuration can trap more amount of the melted conductor 3*a* and the vaporized material thereof. Each of the plurality of first to third openings 24 to 26 formed may have the same size and shape or may have different shapes. For example, the first to third openings 24 to 26 respectively formed near the centers in the width direction of the first to third external connection terminals 7, 8, 17 may be formed larger than the first to third openings 24 to 26 respectively formed near the side edges in the width direction of the first to third external connection terminals 7, 8, 17, so that more amount of the melted conductor 3*a* and the vaporized material thereof can be trapped near the center of the terminals.

Further, since the first and second openings 24, 25 are opened on the sides of the first and second external connection terminals 7, 8 to be interrupted at the time of blowout, discharging the melted conductor 3*a* outside the housing can prevent the melted conductor 3*a* from staying in the housing to advantageously improve the insulation property. Therefore, the number of the first and second openings 24, 25 may be larger than the number of the third openings 26. Alternatively, the total area of the opening of the first and second openings 24, 25 may be formed larger than the total area of the opening of the third opening 26.

Figure 9:
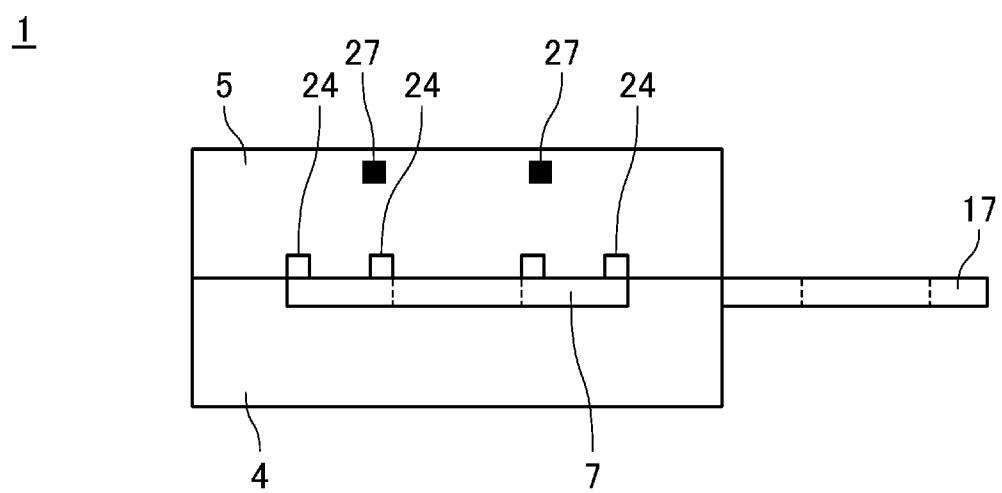
FIG. 9 is a side view of a protecting device according to the present technology.
Figure 10:
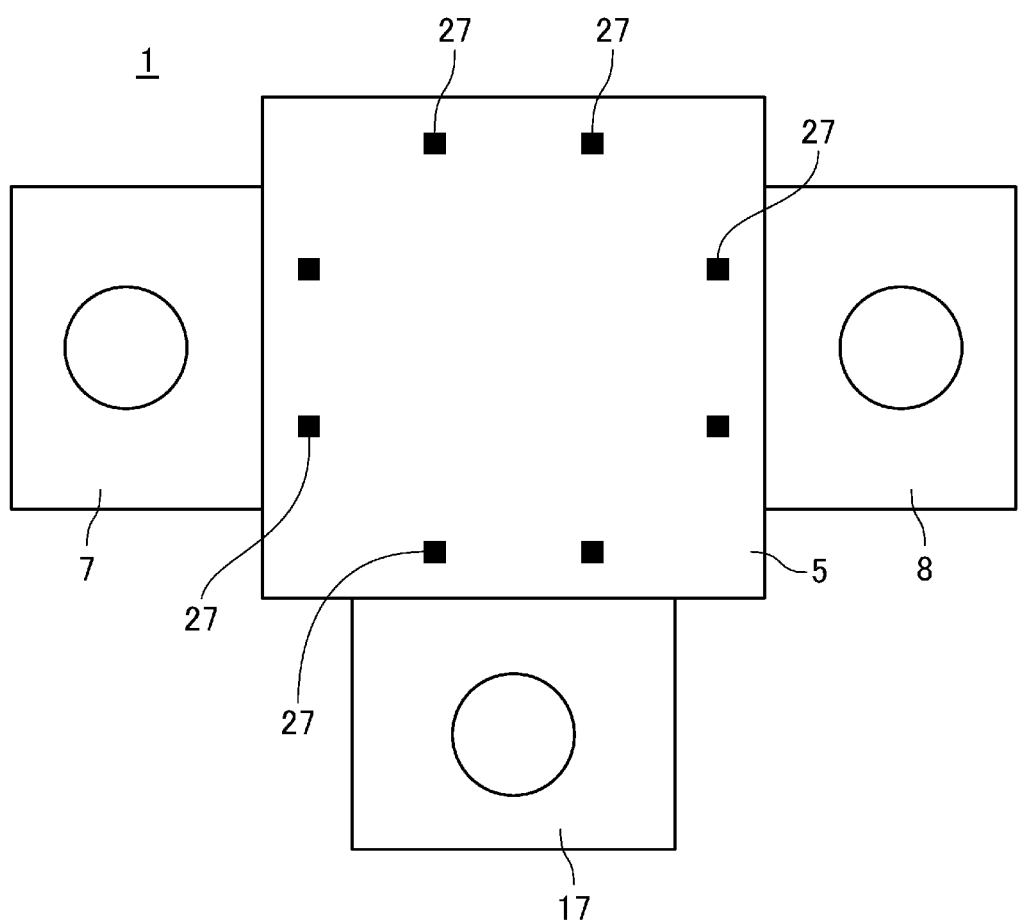
FIG. 10 is a plan view of a protecting device according to the present technology.

In addition to the first to third openings 24 to 26, the protecting device 1 may also be provided with auxiliary openings 27 at portions other than those facing the first to third external connection terminals 7, 8, and 17. The auxiliary openings 27 are openings that are mainly used to release the internal pressure in the housing 6 and can be formed anywhere. For example, as shown in FIG. 9, the auxiliary openings 27 may be formed near the upper edge of the side wall of the upper case 5. Further, as shown in FIG. 10, they may be formed on the top surface of the upper case 5.

Meltable Conductor

Next, the meltable conductor 3 will be described. The meltable conductor 3 is mounted between the first and second external connection terminals 7, 8, and blown due to heat generation by the energization of the heat-generator 10 or due to self-heat generation (Joule heat) by a rate-exceeding current flowing therethrough, to interrupt the current path between the first external connection terminal 7 and the second external connection terminal 8.

The meltable conductor 3 may be a conductive material which melts due to heat generation by energization of the heat-generator 10 or an overcurrent state, and for example, may be made of SnAgCu-based Pb-free solder as well as a BiPbSn alloy, a BiPb alloy, a BiSn alloy, a SnPb alloy, a PbIn alloy, a ZnAl alloy, an InSn alloy, and a PbAgSn alloy, among other materials.

Figure 11:
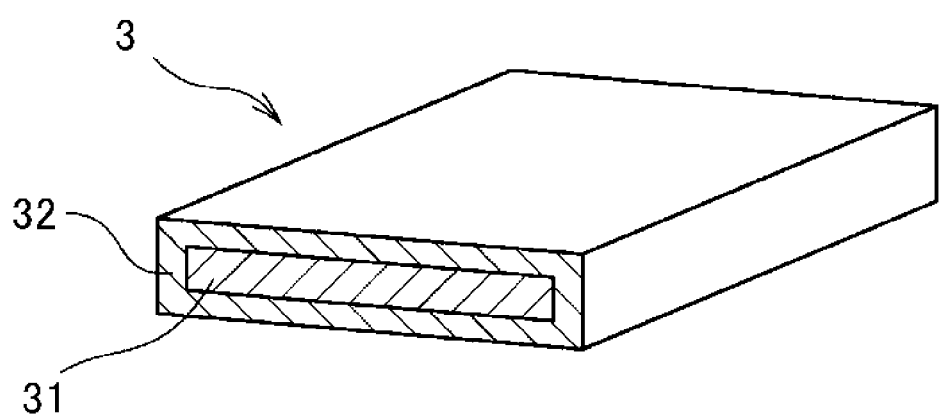
FIG. 11 is an external perspective view of a meltable conductor.

The meltable conductor 3 may have a structure having a high melting point metal and a low melting point metal. For example, as shown in FIG. 11, the meltable conductor 3 may have a laminated structure consisting of an inner layer and an outer layer and may include a low melting point metal layer 31 as the inner layer and a high melting point metal layer 32 as the outer layer laminated on the low melting point metal layer 31. The meltable conductor 3 is connected to the first and second external connection terminals 7, 8 and on the front surface electrode 11 through the bonding material 20 such as solder paste.

The low melting point metal layer 31 is preferably a solder or Sn based metal and is generally referred to as "Pb free solder". The melting point of the low melting point metal layer 31 may have a melting point lower than the temperature of the reflow furnace and may melt at about 200° C. The high melting point metal layer 32 is a metal layer laminated on the surface of the low melting point metal layer 31, made of, for example, Ag or Cu, or a metal containing any of these as a main component, and has a high melting point so as not to melt at the time of reflow process performed to connect the first and second external connection terminals 7, 8 and the front surface electrode 11 to the meltable conductor 3.

This meltable conductor 3 can be formed by forming a high melting point metal layer on a low melting point metal foil using a plating technique or can be formed by using other well-known lamination techniques or film-forming techniques. In this case, the meltable conductor 3 may have a structure in which the entire surface of the low melting point metal layer 31 is covered with the high melting point metal layer 32 or may have a structure in which the entire surface of the low melting point metal layer is covered except for a pair of opposing side surfaces. The meltable conductor 3 may be formed in various configurations, such as a structure having the high melting point metal layer 32 as an inner layer and the low melting point metal layer 31 as an outer layer, a multi-layer structure having three or more layers in which low melting point metal layers and high melting point metal layers are alternately laminated, or a structure in which a part of the inner layer is exposed by providing an opening in a part of the outer layer.

By laminating the high melting point metal layer 32 as an outer layer on the low melting point metal layer 31 as an inner layer, the meltable conductor 3 can maintain the shape as the meltable conductor 3 even when the reflow temperature exceeds the melting temperature of the low melting point metal layer 31 and will not be blown. Therefore, in the protecting device 1, the first and second external connection terminals 7, 8 and the front surface electrode 11 can be efficiently connected to the meltable conductor 3 by reflow. In addition, the protecting device 1 can prevent changes in blowout properties, which might otherwise cause a problem in which the meltable conductor 3 might be deformed to locally increase or decrease the resistance value so that it cannot be blown at a predetermined temperature or will be blown below a predetermined temperature.

The meltable conductor 3 does not melt due to self-heating while a predetermined rated current flows. When a current exceeding the rated value flows, the meltable conductor 3 melts due to self-heating and interrupts the current path between the first and second external connection terminals 7, 8. Further, when the heat-generator 10 is energized and generates heat, the meltable conductor 3 is blown to interrupt the current path between the first and second external connection terminals 7, 8.

Figure 4:
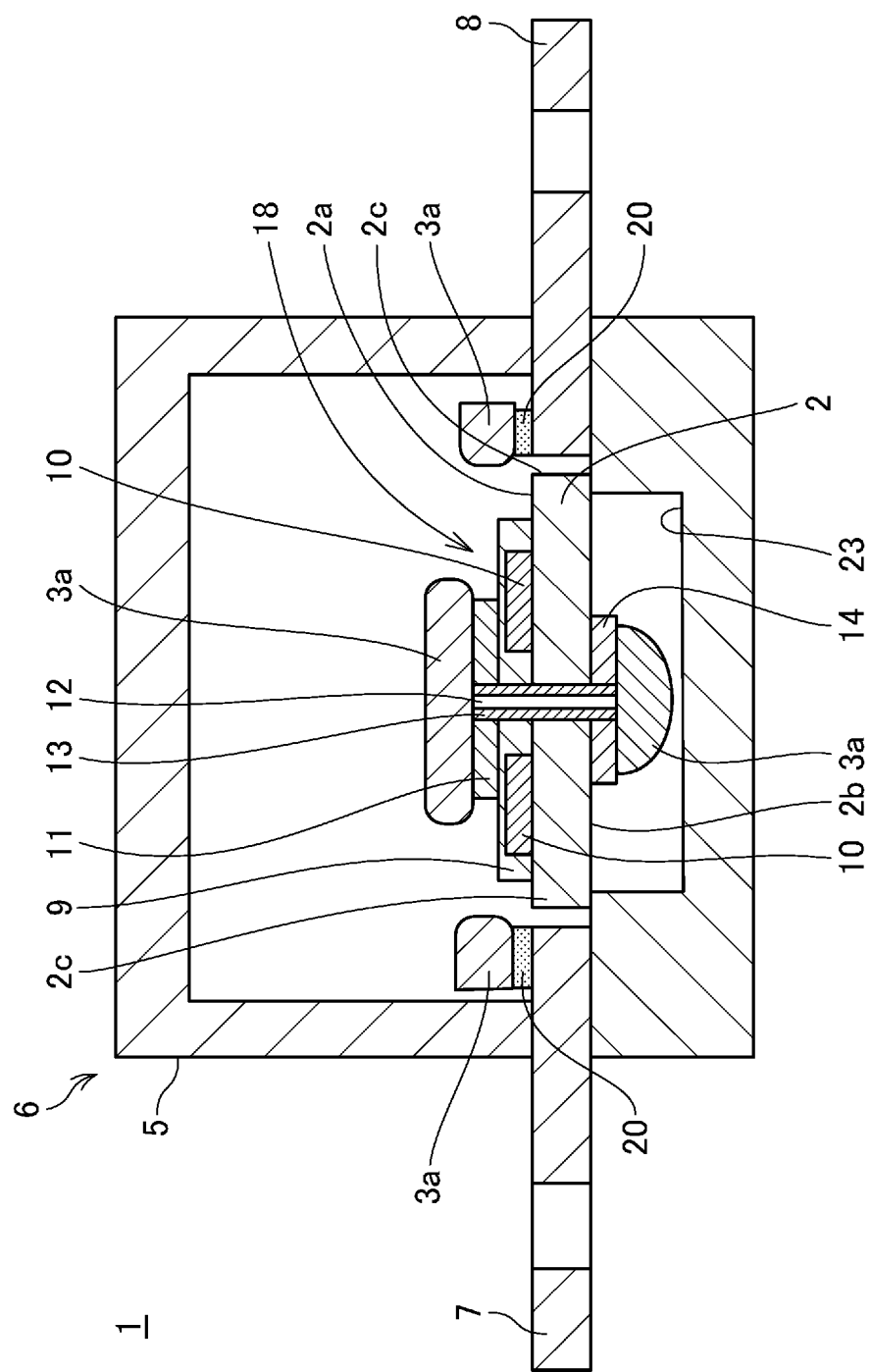
FIG. 4 is a cross-sectional view illustrating a state in which a meltable conductor is melted in a protecting device according to the present technology.

In this case, in the meltable conductor 3, the melted low melting point metal layer 31 erodes the high melting point metal layer 32 (solder erosion), whereby the high melting point metal layer 32 melts at a temperature lower than the melting temperature thereof. Thus, the meltable conductor 3 can be blown in a short time by utilizing the erosion action on the high melting point metal layer 32 by the low melting point metal layer 31. Further, since the melted conductor 3*a* of the meltable conductor 3 is separated by the physical drawing action of the front surface electrode 11 and the first and second external connection terminals 7, 8, the current path between the first and second external connection terminals 7, 8 can be quickly and reliably interrupted (FIG. 4).

In the meltable conductor 3, the volume of the low melting point metal layer 31 is preferably larger than that of the high melting point metal layer 32. The meltable conductor 3 is heated by self-heating by an overcurrent or heat generated by the heat-generator 10, and the low melting point metal melts and erodes the high melting point metal, so that the meltable conductor 3 can melt and interrupt the path quickly. Therefore, by forming the volume of the low melting point metal layer 31 larger than the volume of the high melting point metal layer 32, the meltable conductor 3 can promote the erosive action and can quickly interrupt the path between the first and second external connection terminals 7, 8.

Further, since the meltable conductor 3 is constituted by laminating the high melting point metal layer 32 on the low melting point metal layer 31 serving as an inner layer, the blowout temperature can be significantly decreased as compared with conventional chip fuses or the like made of a high melting point metal. Therefore, the meltable conductor 3 can be formed to have a cross-sectional area larger than a chip fuse or the like of the same size, thereby greatly improving the current rating. Further, the meltable conductor 3 can be made smaller and thinner than a conventional chip fuse having the same current rating and is excellent in rapid blowout property.

In addition, the meltable conductor 3 can improve tolerance to a surge (pulse tolerance) which would occur when an abnormally high voltage is momentarily applied to the electric system incorporating the protecting device 1. For example, the meltable conductor 3 should not be blown in the case of a current of 100 A flowing for a few milliseconds. In this respect, since the large current flowing in an extremely short time flows through the surface layer of the conductor (skin effect), and the meltable conductor 3 is provided with the high melting point metal layer 32 such as Ag plating having a low resistance value as an outer layer, a current caused by a surge can easily flow to prevent blowout due to self-heating. Therefore, the meltable conductor 3 can significantly improve serge tolerance as compared with conventional fuses made of solder alloys.

The meltable conductor 3 may be coated with a flux (not shown) for preventing oxidation and improving wettability at the time of blowout.

Circuit Configuration Example

Figure 12:
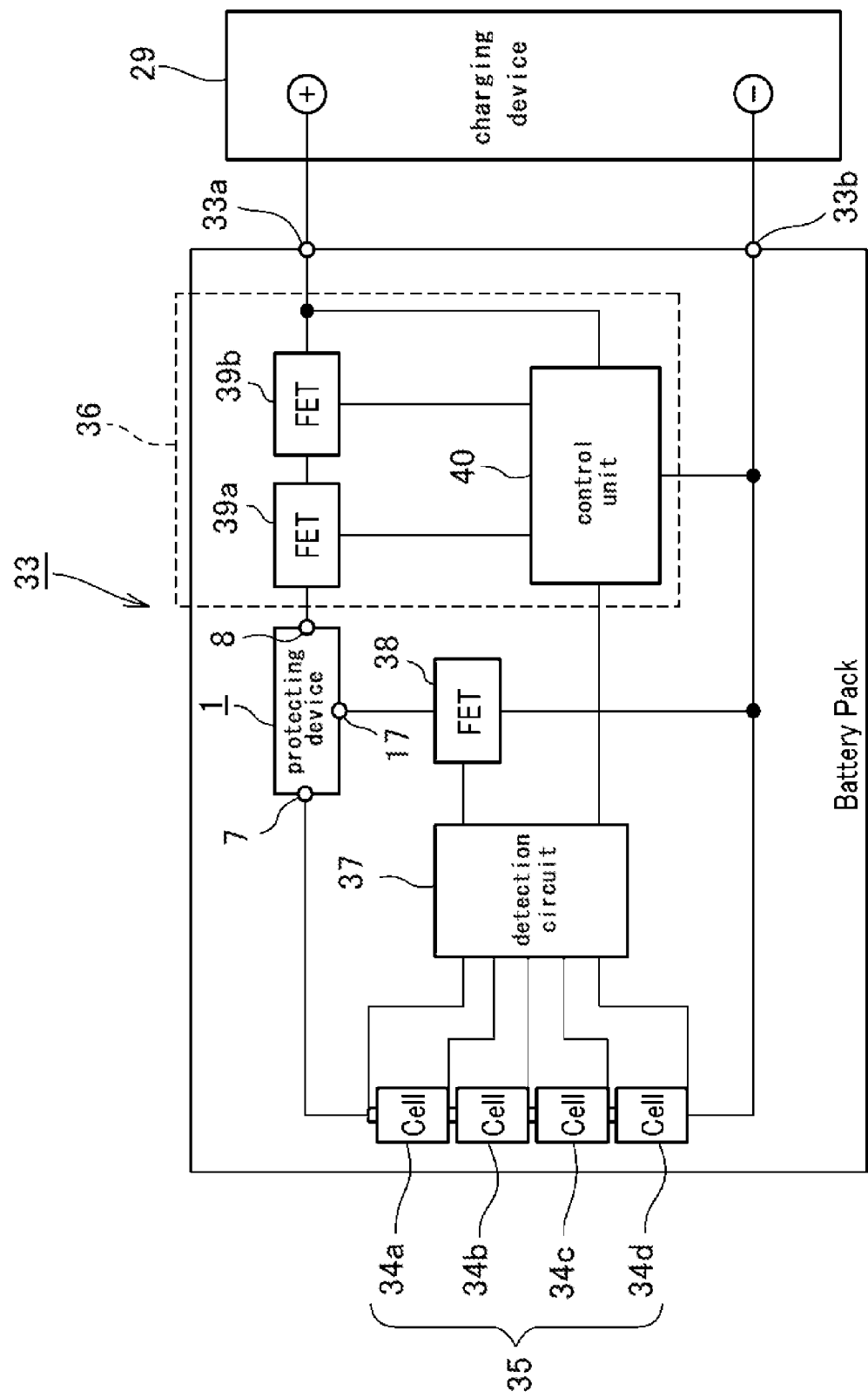
FIG. 12 is a circuit diagram illustrating an example of a configuration of a battery pack.

As shown in FIG. 12, such a protecting device 1 is used, e.g., in a circuit in a battery pack 33 of a lithium ion secondary battery. The battery pack 33 includes a battery stack 35 comprising, e.g., a total of four battery cells 34a to 34d of lithium ion secondary batteries.

The battery pack 33 includes: the battery stack 35; a charge/discharge control circuit 36 for controlling charge/discharge of the battery stack 35; the protecting device 1 according to the present technology for interrupting a charge/discharge path when the state of the battery stack 35 is abnormal; a detection circuit 37 for detecting the voltage of each battery cell 34a to 34d; and a current control element 38 serving as a switching element for controlling the operation of the protecting device 1 according to the detection result of the detection circuit 37.

In the battery stack 35, the battery cells 34a to 34d requiring control for protection from over-charging and over-discharging states are connected in series and are detachably connected to a charging device 29 via a positive electrode terminal 33a and a negative electrode terminal 33b of the battery pack 33, so as to apply charging voltage from the charging device 29. By connecting the positive electrode terminal 33a and the negative electrode terminal 33b to a battery-driven electronic device, the battery pack 33 charged by the charging device 29 can drive the electronic device.

The charge/discharge control circuit 36 includes two current control elements 39a, 39b connected in series in the current path between the battery stack 35 and the charging device 29, and a control unit 40 for controlling operations of the current control elements 39a, 39b. The current control elements 39a, 39b are formed of, for example, a field effect transistors (hereinafter referred to as FETs) and the control unit 40 controls the gate voltage to switch the current path of the battery stack 35 between a conducting state and an interrupted state in the charging and/or discharging direction. The control unit 40 is powered by the charging device 29 and controls the operation of the current control elements 39a, 39b in accordance with the detection result by the detection circuit 37 to interrupt the current path when over-discharging or over-charging occurs in the battery stack 35.

The protecting device 1 is connected in the charge/discharge current path between the battery stack 35 and the charge/discharge control circuit 36, for example, and the operation thereof is controlled by the current control element 38.

The detection circuit 37 is connected to each of the battery cells 34a to 34d so as to detect the voltage values of each of the battery cells 34a to 34d and supplies each of the voltage values to the control unit 40 of the charge/discharge control circuit 36. Furthermore, when an over-charging voltage or an over-discharging voltage is detected in any one of the battery cells 34a to 34d, the detection circuit 37 outputs a control signal for controlling the current control element 38.

When the detection signal output from the detection circuit 37 indicates a voltage exceeding a predetermined threshold value corresponding to over-discharging or over-charging state of the battery cells 34a to 34d, the current control element 38 such as an FET, for example, activates the protecting device 1 to interrupt the charging/discharging current path of the battery stack 35 without the switching operation of the current control elements 39a, 39b.

Figure 13:
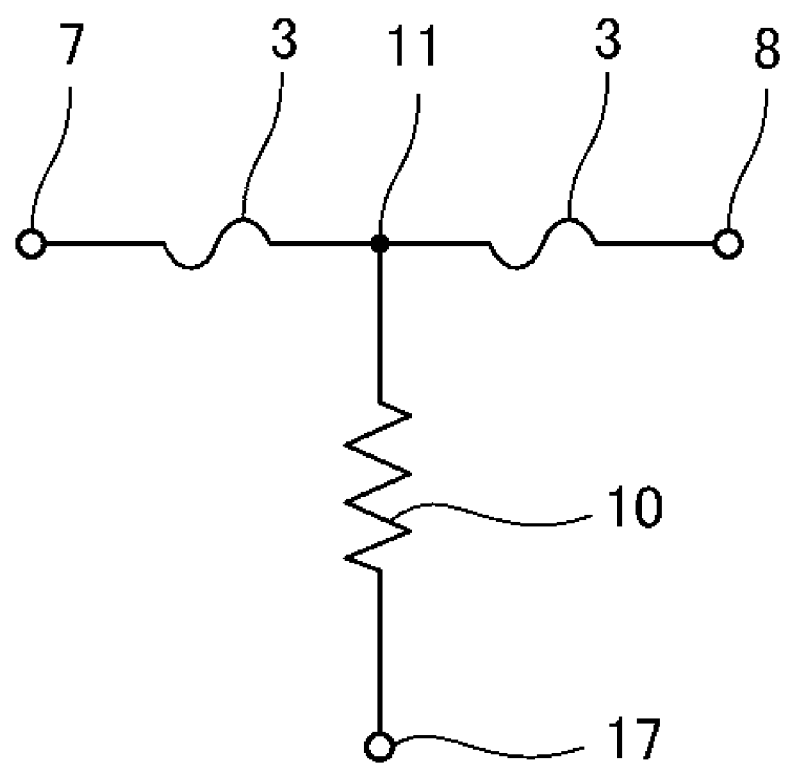
FIG. 13 is a circuit diagram of a protecting device according to the present technology.

The protecting device 1 according to the present technology, which is used in the battery pack 33 having the above-described configuration, has a circuit configuration as shown in FIG. 13. That is, in the protecting device 1, the first external connection terminal 7 is connected to the battery stack 35 side, and the second external connection terminal 8 is connected to the positive electrode terminal 33a side, whereby the meltable conductor 3 is connected in series in the charge/discharge path of the battery stack 35. Furthermore, in the protecting device 1, the heat-generator 10 is connected to the current control element 38 via the heat-generator feeding electrode 16 and the third external connection terminal 17, and the heat-generator 10 is also connected to the open end of the battery stack 35. As a result, one end of the heat-generator 10 is connected to one open end of the meltable conductor 3 and the battery stack 35 via the front surface electrode 11, and the other end is connected to the other open end of the current control element 38 and the battery stack 35 via the third external connection terminal 17. This forms a power supply path to the heat-generator 10 the conduction of which is controlled by the current control element 38.

Operation of Protecting Device

Upon detecting an abnormal voltage in any of the battery cells 34a to 34d, the detection circuit 37 outputs an interruption signal to the current control element 38. Then, the current control element 38 controls the current so as to energize the heat-generator 10. In the protecting device 1, an electrical current flows from the battery stack 35 to the heat-generator 10, and the heat-generator 10 starts heating. In the protecting device 1, the meltable conductor 3 is blown by the heat generation of the heat-generator 10 to interrupt the charge/discharge path of the battery stack 35. In the protecting device 1, by forming the meltable conductor 3 with a high melting point metal and a low melting point metal, the low melting point metal is melted before the melting of the high melting point metal, and the meltable conductor 3 can be blown in a short time by utilizing the erosive action on the high melting point metal by the melted low melting point metal.

In the protecting device 1, by blowing the meltable conductor 3, the power supply path to the heat-generator 10 is also interrupted, thereby stopping the heating of the heat-generator 10.

In addition, even when an overcurrent exceeding the rating is applied to the battery pack 33, the protecting device 1 can blow the meltable conductor 3 by self-heating to interrupt the charge/discharge path of the battery pack 33.

As described above, the protecting device 1 includes the first opening 24 formed facing the front surface of the first external connection terminal 7 and the second opening 25 formed facing the front surface of the second external connection terminal 8. In addition, the protecting device 1 includes the third opening 26 formed facing the front surface of the third external connection terminal 17. Thus, the protecting device 1 can prevent damage of the device by releasing the pressure in the housing.

Further, in the protecting device 1, even when the melted conductor 3a of the meltable conductor 3 and the vaporized material thereof are scattered from the first to third openings 24 to 26 to the outside of the housing 6, they will adhere to and be trapped by the first and second external connection terminals 7, 8 and the third external connection terminal 17 made of metal. Thus, the protecting device 1 can prevent the melted conductor 3a and the vaporized material thereof gushing out of the first to third openings 24 to 26 from adhering to the periphery of the device, thereby preventing the risk of contamination inside the electronic device or an unexpected short circuit.

As described above, in the protecting device 1, the meltable conductor 3 is blown by heat generated in the energized heat-generator 10 or by self-heat generation of the meltable conductor 3 at the time of overcurrent. In this regard, since the meltable conductor 3 has a structure in which a low melting point metal is covered with a high melting point metal, the protecting device 1 can suppress deformation of the meltable conductor 3 even when the meltable conductor 3 is exposed to a high temperature environment such as when the meltable conductor 3 is reflow mounted on the first and second external connection terminals 7, 8 and the front surface electrode 11. Therefore, it is possible to prevent changes in blowout properties caused by changes in resistance values or other problems due to deformation of the meltable conductor 3, and to quickly blow the meltable conductor 3 by the predetermined overcurrent or the heat generation of the heat-generator 10.

The protecting device 1 according to the present technology is not limited to the cases where it is used for a battery pack of a lithium ion secondary battery and is of course applicable to various applications requiring interruption of a current path by an electric signal.

Modified Examples

Figure 14:
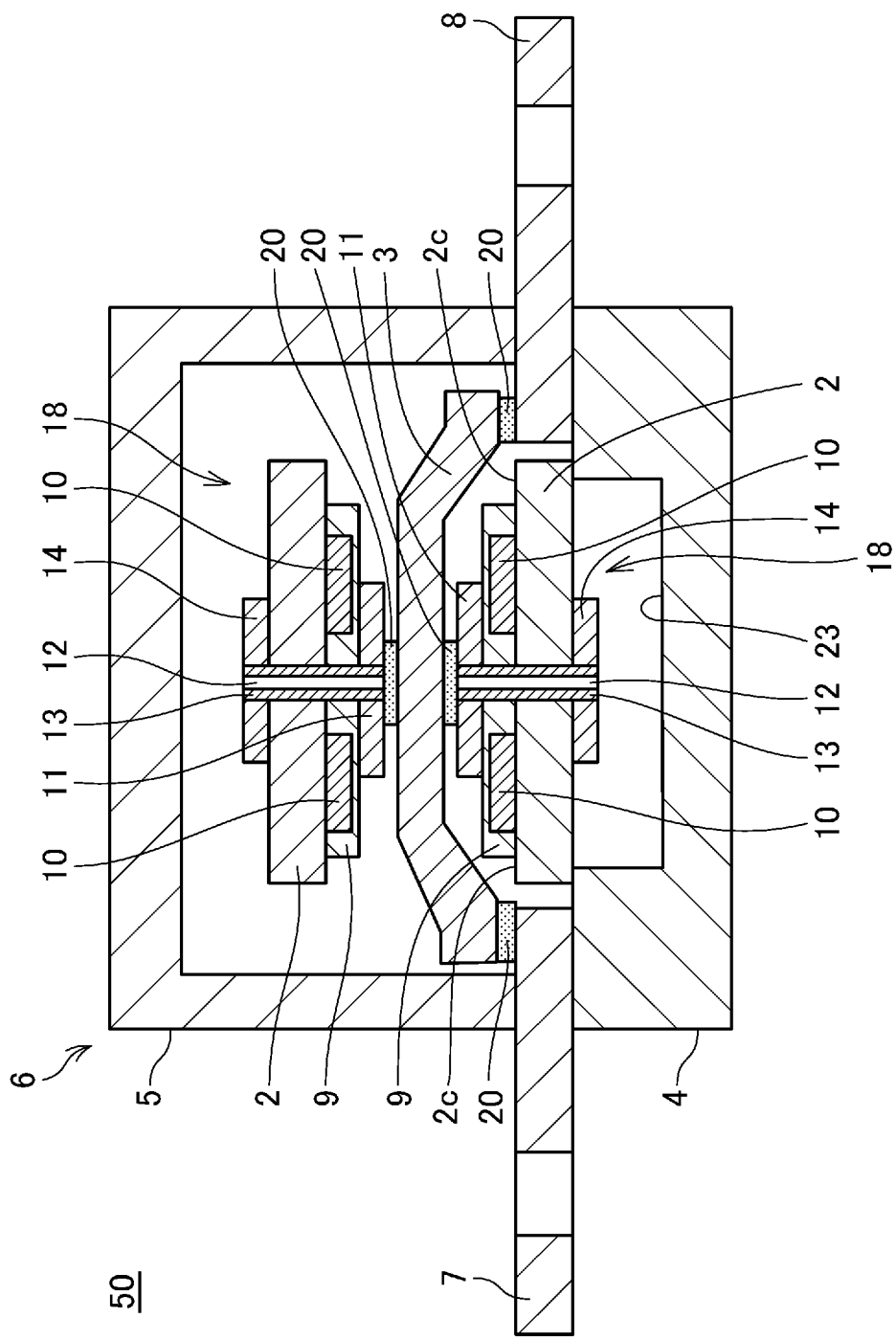
FIG. 14 is a cross-sectional view illustrating a modified example of a protecting device according to the present technology.
Figure 15:
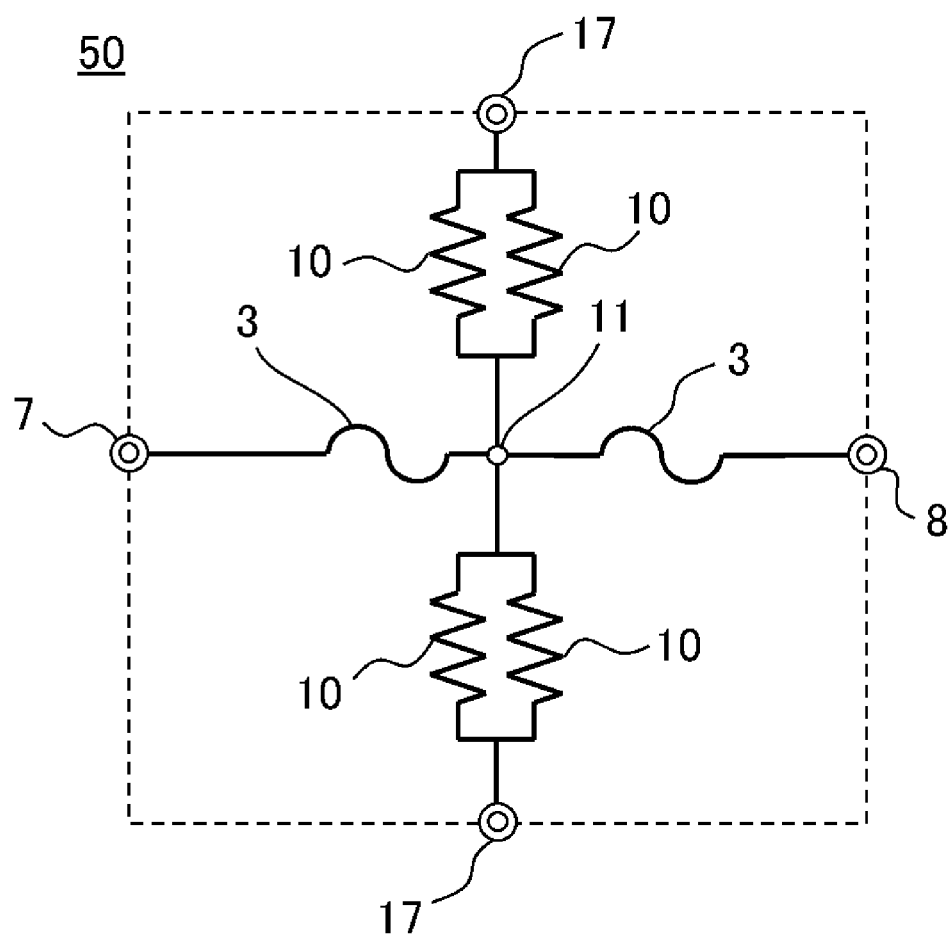
FIG. 15 is a circuit diagram of a protecting device according to a modified example.

Next, modified examples of the protecting device according to the present technology will be described. In the following description, the same components as those of the protecting device 1 described above may be denoted by the same reference numerals and the details thereof may be omitted. As shown in FIG. 14, a protecting device 50 according to the modified example may hold the meltable conductor 3 between a plurality of blowout members 18. In the protecting device 50 shown in FIG. 14, the blowout members 18 are disposed on one side and the other side of the meltable conductor 3, respectively. FIG. 15 is a circuit diagram of the protecting device 50. In each of the blowout members 18 respectively disposed on the front surface and the rear surface of the meltable conductor 3, one end of each of the heat-generators 10 is connected to the meltable conductor 3 via the heat-generator electrode 15 and the front surface electrode 11 formed on each insulating substrate 2, and the other end of each of the heat-generators 10 is connected to a power source for causing the heat-generators 10 to generate heat via the heat-generator feeding electrode 16 and the third external connection terminal 17 formed on each of the insulating substrates 2.

Figure 16:
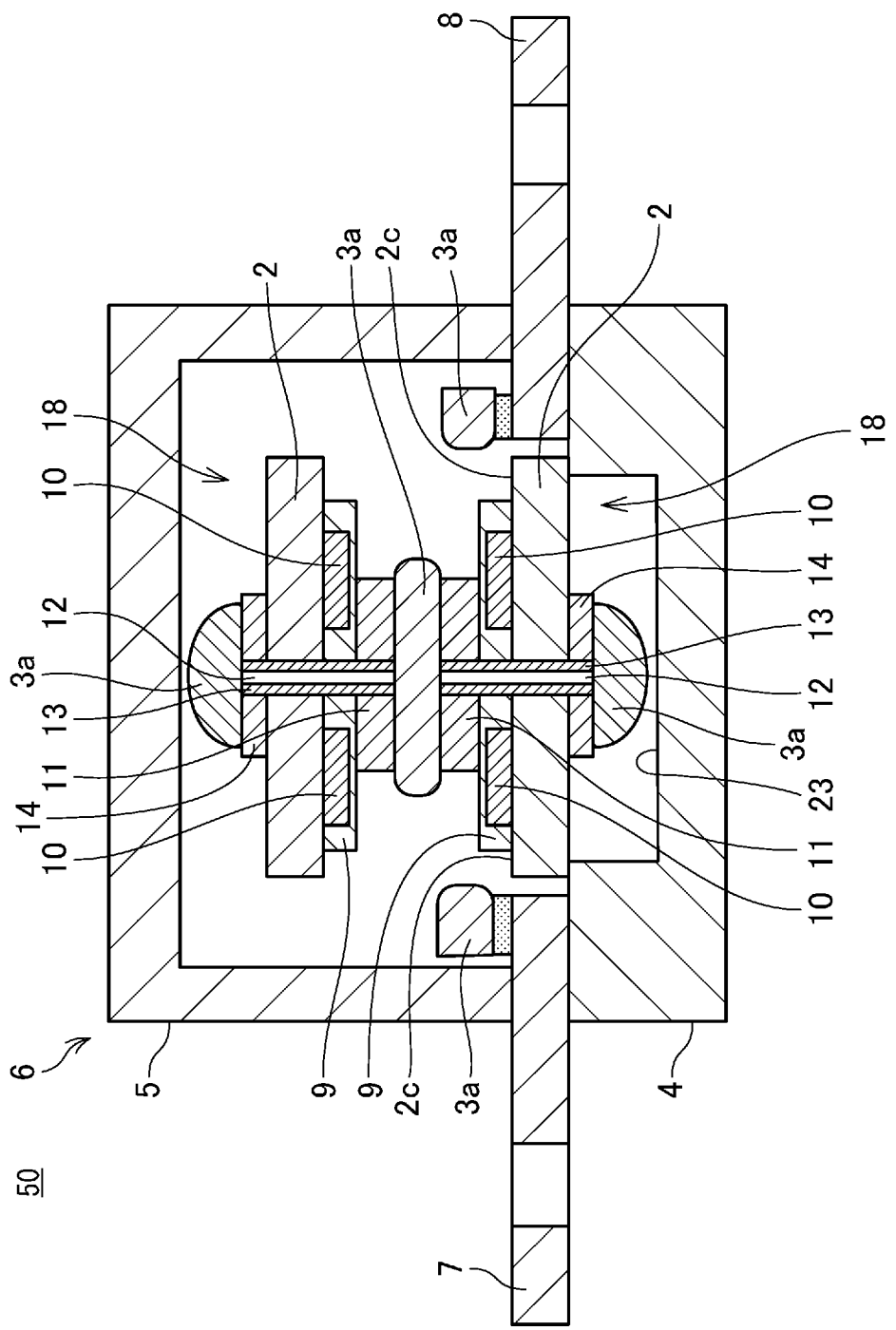
FIG. 16 is a cross-sectional view illustrating a state in which the meltable conductor is melted in the protecting device according to a modified example.
Figure 17:
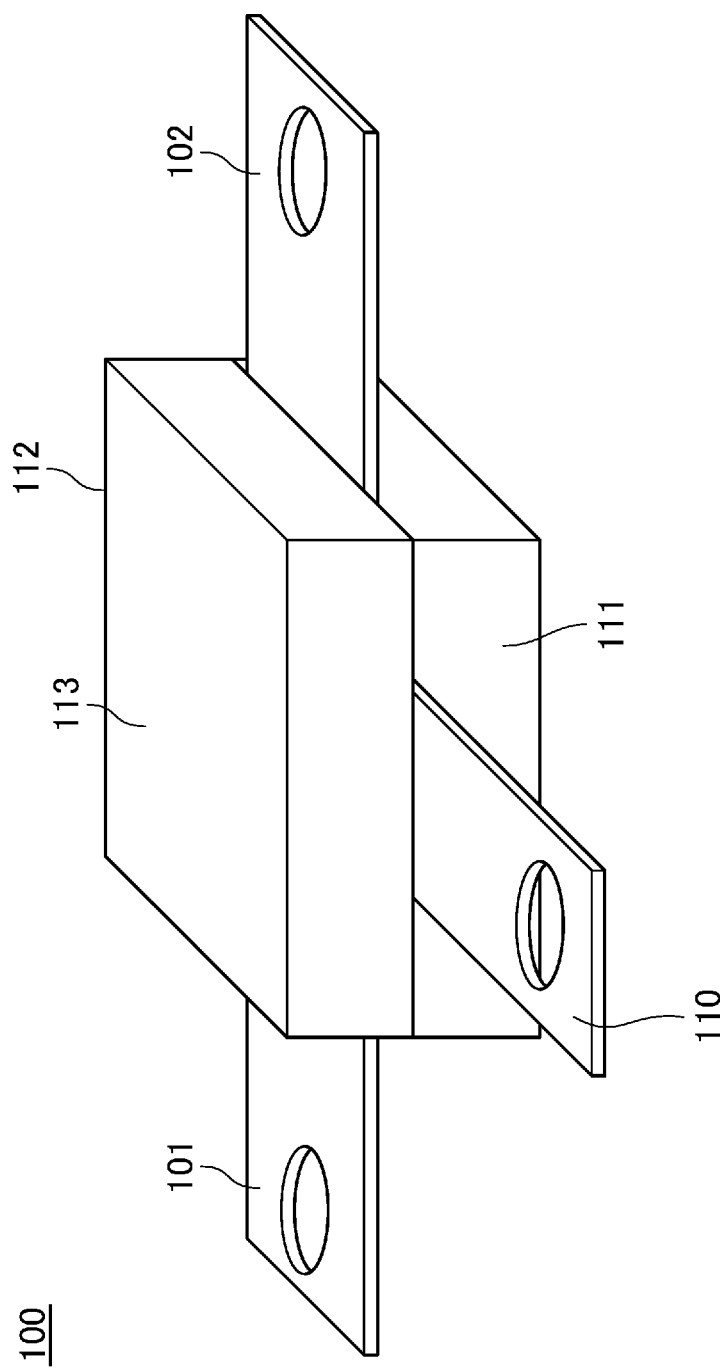
FIG. 17 is an external perspective view illustrating a protecting device compatible with a large current.
Figure 18:
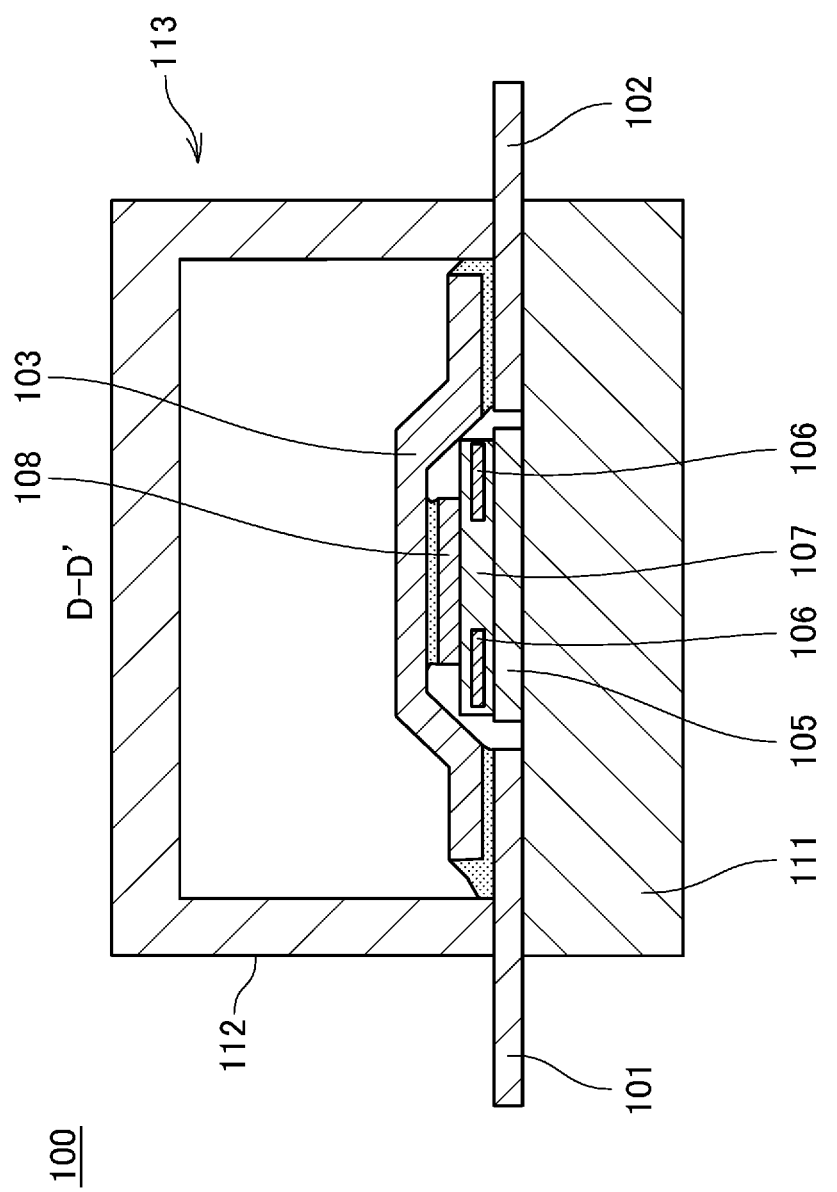
FIG. 18 is a cross-sectional view of the protecting device shown in FIG. 17.
Figure 19:
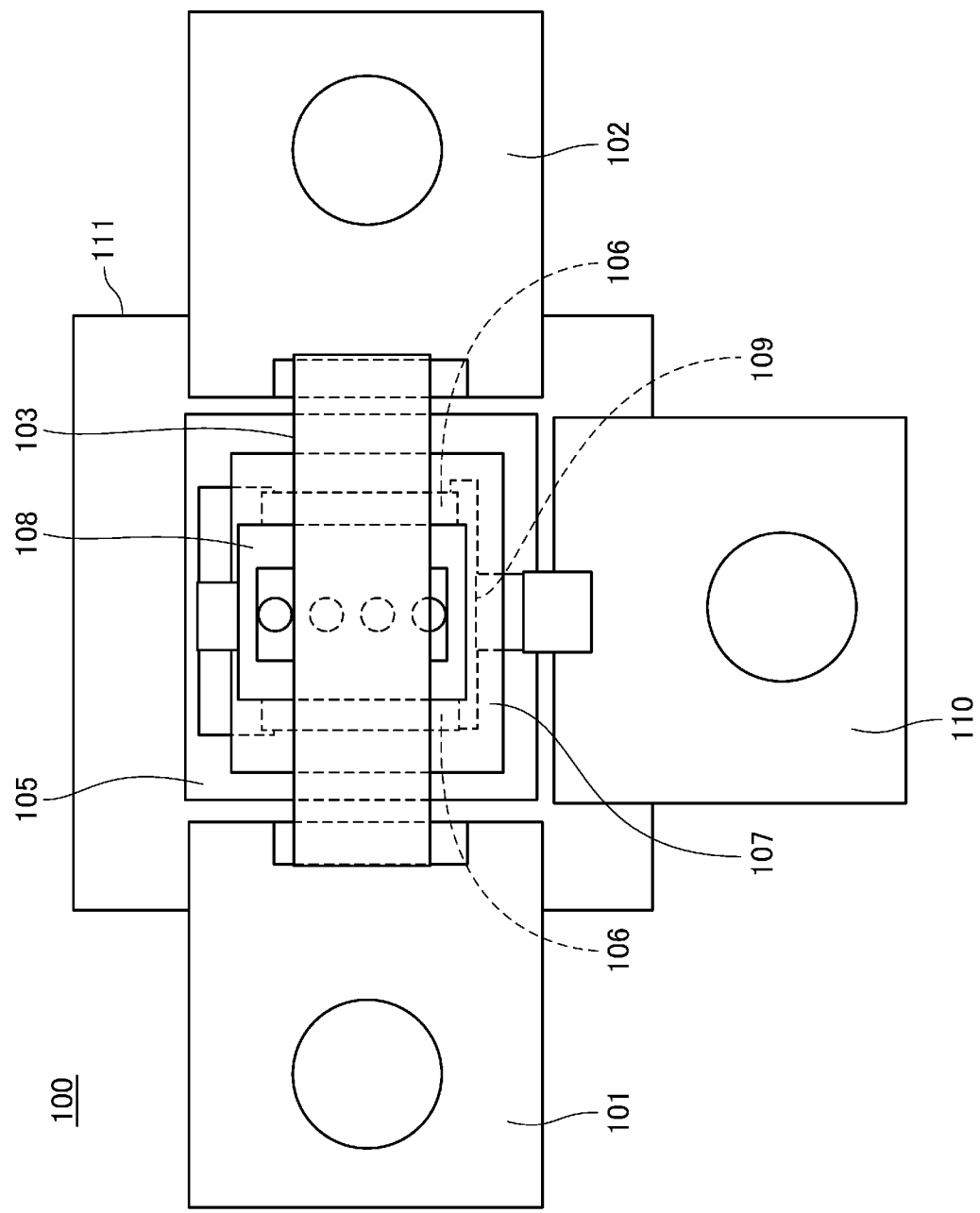
FIG. 19 is a plan view illustrating the protecting device shown in FIG. 17 with the upper case omitted.
Figure 20:
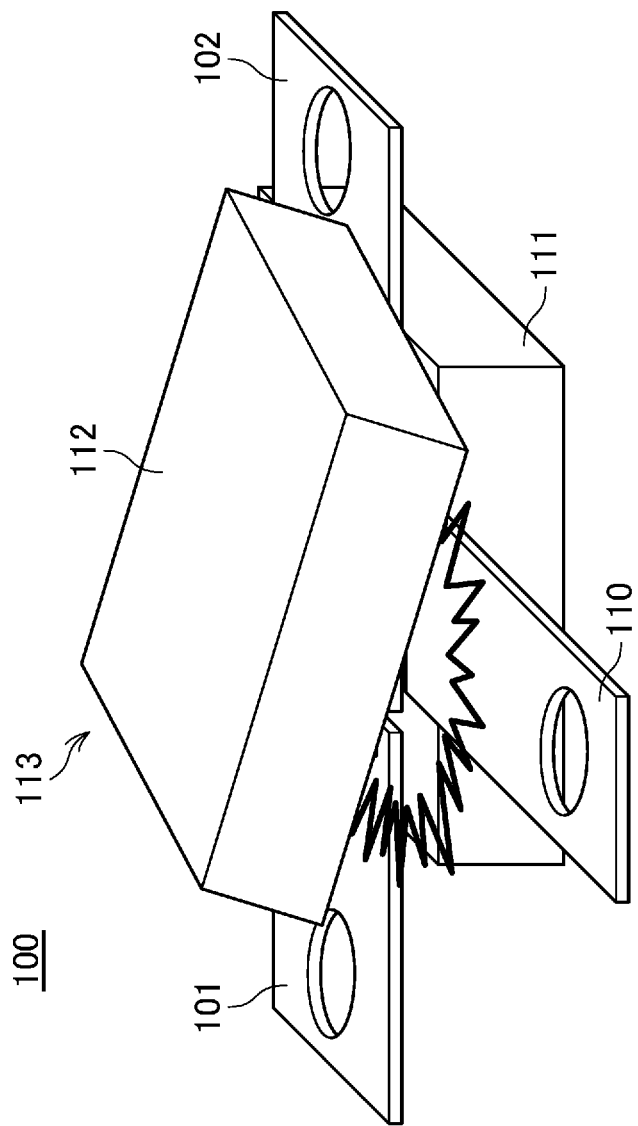
FIG. 20 is a perspective view of the protecting device shown in FIG. 17 showing a state in which the upper case comes off due to the internal pressure at the time of blowout of the meltable conductor.

As shown in FIG. 16, in the protecting device 50, when the meltable conductor 3 is to be blown by the heat generation of the heat-generator 10, the heat-generators 10 of the blowout members 18, 18 connected to both sides of the meltable conductor 3 heat both sides of the meltable conductor 3. Therefore, even when the cross-sectional area of the meltable conductor 3 is increased to be compatible with a large current application, the protecting device 50 can quickly heat and blow the meltable conductor 3.

The protecting device 50 has the housing 6 which is the same as that of the protecting device 1 and includes the first opening 24 formed facing the front surface of the first external connection terminal 7 and the second opening 25 formed facing the front surface of the second external connection terminal 8. In addition, the protecting device 50 includes the third opening 26 formed facing the front surface of the third external connection terminal 17.

The protecting device 50 sucks the melted conductor 3a from both sides of the meltable conductor 3 into each suction hole 12 formed in the insulating substrate 2 of the respective blowout members 18. Accordingly, even when the cross-sectional area of the meltable conductor 3 is increased in order to be compatible with a large current application so that a large amount of the melted conductor 3a is generated, the protecting device 50 can surely blow the meltable conductor 3 by sucking the melted conductor 3a into the plurality of blowout members 18. Further, the protecting device 50 can more quickly blow the meltable conductor 3 by sucking the melted conductor 3a into the plurality of blowout members 18.

The protecting device 50 can also quickly blow the meltable conductor 3 in a case where the meltable conductor 3 has a covering structure in which a low melting point metal constituting an inner layer is covered with a high melting point metal. In this case, even when the heat-generator 10 generates heat, it takes time for the meltable conductor 3 coated with the high melting point metal to be heated to a temperature at which the high melting point metal of the outer layer melts. Here, the protecting device 50 includes a plurality of blowout members 18 and simultaneously generates heat in the respective heat-generators 10 to quickly heat the high melting point metal of the outer layer to the melting temperature. Therefore, according to the protecting device 50, the thickness of the high melting point metal layer constituting the outer layer can be increased, and the rapid blowout property can be maintained while achieving higher rating.

As shown in FIG. 14, in the protecting device 50, it is preferable that the pair of blowout members 18, 18 connected to the meltable conductor 3 face each other. Thus, the protecting device 50 can simultaneously heat the same part of the meltable conductor 3 from both sides and suck the melted conductor 3a by the pair of the blowout members 18, 18 and can heat and blow the meltable conductor 3 more quickly.

In the protecting device 50, the front surface electrodes 11 formed on each of the insulating substrates 2 of the pair of blowout members 18, 18 are preferably face each other via the meltable conductor 3. Thus, since the pair of the blowout members 18, 18 are connected symmetrically, the load applied to the meltable conductor 3 does not become unbalanced in reflow mounting or the like, and resistance to deformation can be improved.

In any case where the heat-generator 10 is formed on the front surface 2a and the rear surface 2b of the insulating substrate 2, it is preferable to form the heat-generators on both sides of the suction hole 12 in order to heat the front surface electrode 11 and the rear surface electrode 14 and to aggregate and suck more amount of the melted conductor 3a.

REFERENCE SIGNS LIST 1 protecting device, 2 insulating substrate, 2a front surface, 2b rear surface, 2c first side edge, 2d second side edge, 3 meltable conductor, 3a melted conductor, 4 lower case, 5 upper case, 6 housing, 7 first external connection terminal, 8 second external connection terminal, 9 insulating layer, 10 heat-generator, 11 front surface electrode, 12 suction hole, 13 conductive layer, 14 rear surface electrode, 15 heat-generator electrode, 16 heat-generator feeding electrode, 17 third external connection terminal, 18 blowout member, 20 bonding material, 24 first opening, 25 second opening, 26 third opening, 29 charging device, 31 low melting point metal layer, 32 high melting point metal layer, 33 battery pack, 33a positive electrode terminal, 33b negative electrode terminal, 34 battery cell, 35 battery stack, 36 charge/discharge control circuit, 37 detection circuit, 38 current control element, 39 current control element, 40 control unit, 50 protecting device, 100 protecting device

The invention claimed is:

1. A protecting device, comprising:
a meltable conductor;
first and second external connection terminals connected to both ends of the meltable conductor; and
a housing having a lower case and an upper case,
wherein one end of the first external connection terminal and one end of the second external connection terminal are led out from the housing, and
wherein the housing is provided with a first opening formed facing a front surface of the first external connection terminal, and a second opening formed facing a front surface of the second external connection terminal,
wherein at least one of the first opening and the second opening has a lower side the width of which is wider than that of an upper side in a side view.

2. The protecting device according to claim 1,
wherein the first and second external connection terminals are led out from between the lower case and the upper case, and
wherein the first and second openings are formed at lower edges of side walls of the upper case.

3. The protecting device according to claim 1, further comprising
an insulating substrate having a front surface on which the meltable conductor is mounted,
wherein a back surface of the insulating substrate is supported by the lower case,
wherein the insulating substrate is provided with a heat-generator and a third external connection terminal connected to the heat-generator and serving as a power supply terminal of the heat-generator,
wherein one end of the third external connection terminal is led out from the housing, and
wherein the housing has a third opening formed facing a front surface of the third external connection terminal.

4. The protecting device according to claim 3,
wherein the third external connection terminal is led out from between the lower case and the upper case, and
wherein the third opening is formed at a lower edge portion of a side wall of the upper case.

5. The protecting device according to claim 3, wherein the third opening has a lower side the width of which is wider than that of an upper side in a side view.

6. The protecting device according to claim 1, wherein a plurality of the first openings and the second openings are formed.

7. The protecting device according to claim 3, wherein a plurality of the third openings are formed.

8. The protecting device according to claim 1, wherein an auxiliary opening is formed in a portion of the protecting device other than the portion from which the first external connection terminal and the second external connection terminal are led out.

9. The protecting device according to claim 1, wherein at least one of the first opening and the second opening is a triangular shape.

10. The protecting device according to claim 1, wherein at least one of the first opening and the second opening is a trapezoidal shape.

11. The protecting device according to claim 1, wherein the first opening and the second opening have a lower side the width of which is wider than that of an upper side in a side view.

12. The protecting device according to claim 11, wherein at least one of the first opening and the second opening is a triangular shape.

13. The protecting device according to claim 11, wherein at least one of the first opening and the second opening is a trapezoidal shape.

14. A battery pack, comprising:
one or more battery cells; and
a protecting device connected to a charge/discharge path of the battery cell to interrupt the charge/discharge path,
wherein the protecting device comprises:
a meltable conductor;
first and second external connection terminals connected to both ends of the meltable conductor; and
a housing having a lower case and an upper case,
wherein one end of the first external connection terminal and one end of the second external connection terminal are led out from the housing, and
wherein the housing is provided with a first opening formed facing a front surface of the first external connection terminal, and a second opening formed facing a front surface of the second external connection terminal,
wherein at least one of the first opening and the second opening has a lower side the width of which is wider than that of an upper side in a side view.

* * * * *